(12) United States Patent
Buxton et al.

(10) Patent No.: US 10,724,587 B2
(45) Date of Patent: Jul. 28, 2020

(54) DISC BRAKE PAD FOR A VEHICLE

(71) Applicant: Federal-Mogul Motorparts LLC, Southfield, MI (US)

(72) Inventors: Carl Richard Buxton, Cookeville, TN (US); Joshua Roberts, Cookeville, TN (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 74 days.

(21) Appl. No.: 16/017,975

(22) Filed: Jun. 25, 2018

(65) Prior Publication Data

US 2019/0003537 A1 Jan. 3, 2019

Related U.S. Application Data

(60) Provisional application No. 62/525,907, filed on Jun. 28, 2017.

(51) Int. Cl.
| | | |
|---|---|---|
| *F16D 65/092* | (2006.01) | |
| *F16D 65/847* | (2006.01) | |
| *F16D 69/00* | (2006.01) | |

(52) U.S. Cl.
CPC ......... *F16D 65/092* (2013.01); *F16D 65/847* (2013.01); *F16D 2069/004* (2013.01)

(58) Field of Classification Search
CPC ...... F16D 65/847; F16D 65/092; F16D 69/00; F16D 2069/004; F16D 2065/026
USPC ..... 188/251 R, 250 B, 251 A, 264 B, 250 G, 188/250 R
See application file for complete search history.

(56) References Cited

U.S. PATENT DOCUMENTS

| | | | |
|---|---|---|---|
| 5,564,533 A | 10/1996 | Parsons | |
| 6,119,828 A | 9/2000 | Parsons | |
| 8,205,734 B2 | 6/2012 | Sudau et al. | |
| D784,874 S * | 4/2017 | Buxton | D12/180 |
| D787,392 S * | 5/2017 | Buxton | D12/180 |
| 2007/0034462 A1 | 2/2007 | Themelin et al. | |
| 2009/0031550 A1 | 2/2009 | Liu et al. | |
| 2012/0031718 A1 | 2/2012 | Arbesman et al. | |

(Continued)

FOREIGN PATENT DOCUMENTS

| | | |
|---|---|---|
| CN | 201687873 U | 12/2010 |
| CN | 202176648 U | 3/2012 |
| CN | 102954136 A | 3/2013 |

(Continued)

OTHER PUBLICATIONS

International Search Report corresponding to International application No. PCT/US2018/039256, dated Oct. 26, 2018, 3 pages.

(Continued)

*Primary Examiner* — Robert A. Siconolfi
*Assistant Examiner* — San M Aung
(74) *Attorney, Agent, or Firm* — James D. Stevens

(57) ABSTRACT

A brake pad having a backing plate and a friction pad, with the friction pad including a particular slot configuration in the friction surface. The friction pad includes a slot with a main body portion and an angled cutout portion. The angled cutout portion includes a radial arc extension that helps form a continuous cooling arc at a portion of a top radius of the peripheral edge of the friction pad. The slot features can help promote desirable airflow patterns while the brake pad is in use.

20 Claims, 1 Drawing Sheet

(56) References Cited

U.S. PATENT DOCUMENTS

2016/0003317 A1\* 1/2016 Buxton .................. F16D 69/00
  188/250 B

FOREIGN PATENT DOCUMENTS

| | | |
|---|---|---|
| CN | 103322089 A | 9/2013 |
| CN | 203348382 U | 12/2013 |
| CN | 203374713 U | 1/2014 |
| CN | 103591198 A | 2/2014 |
| CN | 103883653 A | 6/2014 |
| CN | 203770495 U | 8/2014 |
| CN | 105179536 A | 12/2015 |
| DE | 2404671 A1 | 7/1975 |
| EP | 1798439 A1 | 6/2007 |
| EP | 2383485 A1 | 11/2011 |
| FR | 2257045 A1 | 8/1975 |
| JP | 2000145848 A | 5/2000 |
| JP | 2006349044 A | 12/2006 |
| KR | 20-1998-0049581 U | 10/1998 |
| KR | 20050100980 A | 10/2005 |
| KR | 20090060986 A | 6/2009 |

OTHER PUBLICATIONS

Written Opinion corresponding to International application No. PCT/US2018/039256, dated Oct. 26, 2018, 7 pages.

\* cited by examiner

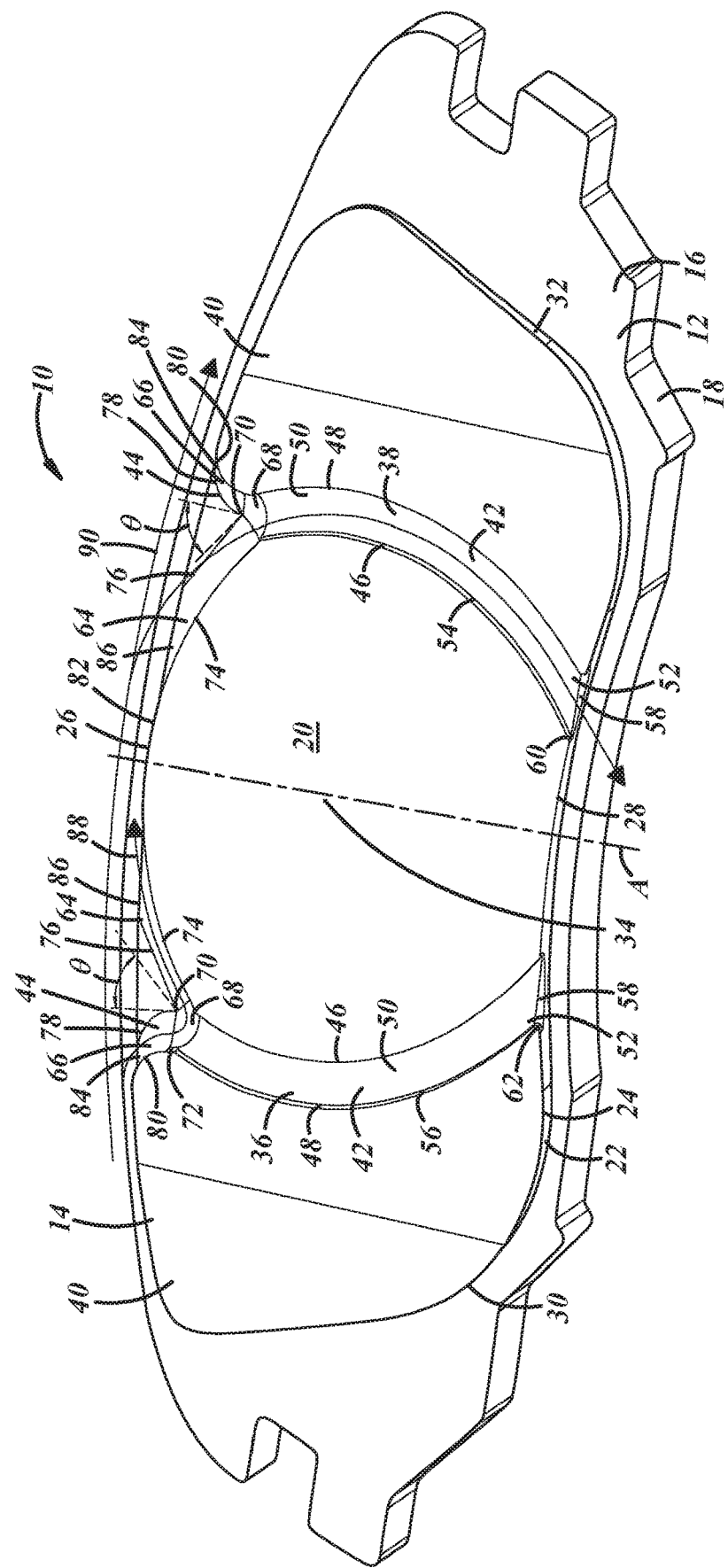

DISC BRAKE PAD FOR A VEHICLE

CROSS-REFERENCE TO RELATED APPLICATION

This application claims the benefit of U.S. Provisional Application Ser. No. 62/525,907 filed on Jun. 28, 2017, the entire contents of which are hereby incorporated by reference.

TECHNICAL FIELD

This invention relates to vehicle disc brake pads, and more particularly, to slotted vehicle disc brake pads.

BACKGROUND

Disc brake pads are used in a variety of vehicles of varying size, including motorcycles, automobiles, and trucks, and generally include a backing plate and a friction pad attached to the backing plate. The size and shape of the brake pads, backing plates, and/or friction pads may vary depending upon the size and/or weight of the vehicle with which they are used. One or more features such as slots may be included in the friction surface to aid in cooling. Particular configurations for the slots may amplify the speed and/or amount of airflow, thereby improving the cooling effect.

SUMMARY

According to one embodiment, there is provided a brake pad comprising a backing plate and a friction pad. The friction pad has a friction surface defined at least in part by a peripheral edge and a slot formed in the friction surface. The peripheral edge has a top radius, a bottom radius, and sides between the top radius and the bottom radius. The slot includes a main body portion and a pronged angled cutout portion that interfaces with the peripheral edge.

According to another embodiment, there is provided a brake pad comprising a backing plate and a friction pad. The friction pad has a friction surface, a first curved slot formed in the friction surface, and a second curved slot formed in the friction surface. Each curved slot has a main body portion and a radial arc extension having an inner circumference. A portion of a top radius of the friction pad and the inner circumferences of each radial arc extension form a continuous cooling arc.

BRIEF DESCRIPTION OF THE DRAWING

Preferred exemplary embodiments of the invention will hereinafter be described in conjunction with the appended drawing containing a FIGURE that is a partial perspective view of a brake pad according to one embodiment.

DETAILED DESCRIPTION OF THE ILLUSTRATED EMBODIMENT

The friction pad embodiments disclosed herein may be used in various disc brake pad designs and in various vehicle applications to help improve the airflow across the friction material. The inclusion of a slot with an angled cutout that interfaces with a top radius of the friction pad can help increase the amount of air and/or the speed of air which cools the friction material. Other various slot features discussed herein can also help promote cooling of the friction material. The presently disclosed friction pad may help extend the useful life of the brake pad, for example, by improving the thermal management of the brake pad via the advantageous airflow patterns that may be developed during use of the brake pad.

Referring to the FIGURE, there is shown a disc brake pad 10. The brake pad 10 includes a backing plate 12 and a friction pad 14. The backing plate 12 includes a front face 16 and a periphery 18. The friction pad 14 is attached to the front face 16 of the backing plate 12 and includes a friction surface 20 facing away from the backing plate 12, a peripheral sidewall 22, and a peripheral edge 24 comprising a top radius 26, a bottom radius 28, and sides 30, 32. When installed in a braking system, typically the top radius 26 is situated toward the outer diameter of the rotor and the bottom radius 28 is situated toward the center of the rotor. The friction surface 20 has a generally defined center portion 34 which is framed by slots 36, 38. Various slot features described herein can help improve the cooling effect as compared with more standard slots or grooves formed in the friction surface of prior art disc brake pads. The backing plate 12 or the friction pad 14 may also include other features such as one or more chamfered surfaces 40, which may be flat or curved surfaces, or features not illustrated in this particular embodiment, such as caliper attachment projections, wear sensors, etc.

The slots 36, 38 may be molded in, or formed in a secondary operation in which a partially or fully formed friction pad 14 is routed or otherwise grooved along a desired path. CNC routing of the slots 36, 38 is one such method. Including a curve in one or more portions of the slots 36, 38 can help increase the surface area exposed to the cooling airflow. Accordingly, the slots 36, 38 may follow a mathematically defined curved path, such as a simple sinusoidal or more complex curve defined by a polynomial, curve fit, or other formula or numerically specified path. The slots 36, 38 each generally include a main body portion 42 and an angled cutout portion 44.

The main body portion 42 of each slot 36, 38 has an inner circumference 46 and an outer circumference 48 with a sloped internal wall 50 therebetween. The sloped internal wall 50 is generally U-shaped; however, in this embodiment, a nadir 52 of each internal wall 50 is skewed toward the outer circumference 48 and the respective side 30, 32. Each sloped internal wall 50 is angled toward the center portion 34 of the friction pad (i.e., a line tangential to the nadir 52 is angled with respect to the friction surface 20), which may help encourage desirable airflow paths, which will be detailed further below. The sloped internal wall 50 may include a chamfered interior edge 54 and/or a chamfered exterior edge 56 to ease the transition between the slot 36, 38 and the friction surface 20. The main body portion 42 may further include an exit wall 58 which interfaces with the bottom radius 28 of the friction pad 14. As with the sloped internal wall 50, the exit wall 58 may include a chamfered interior exit wall edge 60 and/or a chamfered exterior exit wall edge 62.

Slots 36, 38 may also include an angled cutout portion 44 which interfaces with the top radius 26 of the friction pad 14 at the peripheral sidewall 22. The angled cutout portion 44 is completely recessed with respect to the friction surface 20, and in this embodiment, has two prongs comprising a radial arc extension 64 and a convex shoulder extension 66. A junction wall 68 is situated between the main body portion 42, the radial arc extension 64, and the convex shoulder extension 66. A vertex 70 is situated where the junction wall 68, the radial extension 64, and the convex shoulder extension 66 meet. The junction wall 68 may include one or more chamfered junction wall edges 72 to ease the transition between the angled cutout portion 44 and the friction surface 20. The radial arc extension 64 and/or the convex shoulder extension 66 may also include one or more chamfered edges. As shown in the FIGURE, the angled cutout portion 44 extends into less than the top quarter of the friction pad 14, which provides for a larger circular center portion 34 available for contacting the rotor.

The radial arc extension 64 may include an inner circumference 74 and an outer circumference 76, and the convex shoulder extension 66 may include an inner circumference 78 and an outer circumference 80. In one embodiment, the inner circumferences 74 of each radial arc extension 64 form a continuous cooling arc 82 with a portion of the top radius 26. Further, the convex shoulder extension can include an angled entry interface 84 and the radial arc extension may include a widened airflow interface 86. Certain geometrical relationships may help encourage airflow into and/or out of the angled entry interface 84 or the widened airflow interface 86. For example, in the illustrated embodiment, the vertex 70 is formed between the inner circumference 78 of the convex shoulder extension 66 and the outer circumference 76 of the radial arc extension 64. An angle θ at the vertex 70 may be between about 60° and 70°, inclusive, or more particularly, about 65° in one embodiment, to encourage airflow into and/or out of the angled entry interface 84 or the widened airflow interface 86.

Various features of the angled cutout portion 44 can encourage desirable airflow patterns when the brake pad 10 is in use. A first airflow stream 88 and a second airflow stream 90 are illustrated in the FIGURE. As shown, the first airflow stream 88 enters the slot 36 at the angled entry interface 84 of the convex shoulder extension 66. Upon contact with the junction wall 68, at least part of the airflow stream 88 is deflected toward the radial arc extension 64. The airflow stream 88 continues toward the widened airflow interface 86 to help cool the top radius 26 along the continuous cooling arc 82. At least a portion of the airflow stream 88, along with the second airflow stream 90 may comprise captured airflow from the outer diameter of the rotor. As shown in FIG. 1, the angled cutout portion 44 of the second slot 38 may help draw the airflow stream 90 into the main body portion 42 to encourage airflow down to the bottom radius 28. Since the convex shoulder extension 66 of the second slot 38 projects further toward a center axis A of the friction pad 14, more of the airflow stream 90 may be encouraged to enter the main body portion 42 of the slot 38. Moreover, given that in this embodiment, the slots 36, 38 are symmetrical with respect to the center axis A of the friction pad 14, the continuous cooling arc 82 is also symmetrical, and more air or a higher speed air stream may be accessible to contact and cool the friction material. Any or all of the curved slot portions such as the radial arc extension 64, the convex shoulder extension 66, the continuous cooling arc 82, and/or the curvature of the main body portion 42, may encourage airflow via the Coandă effect, in which a fluid jet or air stream may be encouraged to attach or follow a convex surface. Moreover, one or more combinations of the various features, such as the first and second radial arc extensions 64 with the portion of the top radius 26 to form the continuous cooling arc 82, may encourage desirable airflow patterns. Additionally, the combination of features at the angled cutout portion 44, such as the radial arc extension 64, the convex shoulder extension 66, with the junction wall 68 therebetween, may facilitate more air or higher speed air to help cool the friction pad 14.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A brake pad, comprising:
a backing plate; and
a friction pad having a friction surface defined at least in part by a peripheral edge and a slot formed in the friction surface, the peripheral edge having a top radius, a bottom radius, and sides between the top radius and the bottom radius, wherein the slot includes a main body portion and a pronged angled cutout portion that interfaces with the peripheral edge, wherein the pronged angled cutout portion includes two or more prongs that join the peripheral edge.

2. The brake pad of claim 1, wherein the pronged angled cutout portion interfaces with the top radius of the peripheral edge.

3. The brake pad of claim 1, wherein the main body portion has an inner circumference, an outer circumference, and a sloped internal wall between the inner circumference and the outer circumference.

4. The brake pad of claim 3, wherein the sloped internal wall has a nadir that is skewed toward the outer circumference.

5. The brake pad of claim 3, wherein the sloped internal wall is angled toward the center portion.

6. The brake pad of claim 3, wherein the sloped internal wall has a chamfered interior edge and a chamfered exterior edge.

7. The brake pad of claim 1, wherein the main body portion includes an exit wall that interfaces with the bottom radius of the peripheral edge.

8. The brake pad of claim 7, wherein the exit wall includes a chamfered interior exit wall edge and a chamfered exterior exit wall edge.

9. The brake pad of claim 1, further comprising a second slot, wherein the first slot and the second slot mirror each other and frame a center portion of the friction surface.

10. The brake pad of claim 1, wherein the pronged angled cutout portion includes a radial arc extension and a convex shoulder extension.

11. The brake pad of claim 10, wherein the convex shoulder extension includes an angled entry interface and the radial arc extension includes a widened airflow interface.

12. A brake pad, comprising:
a backing plate; and
friction pad having a friction surface defined at least in part by a peripheral edge and a slot formed in the friction surface, the peripheral edge having a top radius, a bottom radius, and sides between the top radius and the bottom radius, wherein the slot includes a main body portion and a pronged angled cutout portion that interfaces with the peripheral edge, wherein the pronged angled cutout portion includes a radial arc extension and a convex shoulder extension, and wherein the slot includes a junction wall that is situated between the main body portion, the radial arc extension, and the convex shoulder extension.

13. The brake pad of claim 12, wherein the pronged angled cutout portion includes a vertex where the junction wall, the radial arc extension, and the convex shoulder extension meet.

14. The brake pad of claim 13, wherein an angle at the vertex is between 60° and 70°, inclusive.

15. The brake pad of claim 12, wherein the junction wall includes one or more chamfered junction wall edges.

16. The brake pad of claim 10, wherein the radial arc extension includes an inner circumference and an outer circumference, and the convex shoulder extension includes an inner circumference and an outer circumference.

17. The brake pad of claim 16, wherein the friction surface includes a second slot with a main body portion and a pronged angle cutout, the pronged angled cutout of the second slot includes a radial arc extension and a convex should extension, wherein the radial arc extension of the second slot includes an inner circumference and an outer circumference.

18. The brake pad of claim 17, wherein the inner circumferences of each radial arc extension form a continuous cooling arc with a portion of the top radius.

19. A brake pad, comprising:
a backing plate; and
a friction pad having a friction surface, a first curved slot formed in the friction surface, and a second curved slot formed in the friction surface, wherein each curved slot has a main body portion and a radial arc extension having an inner circumference, wherein a portion of a top radius of the friction pad and the inner circumferences of each radial arc extension form a continuous cooling arc.

20. The brake pad of claim 19, wherein each curved slot has a convex shoulder extension that meets the radial arc extension at a junction wall, and each curved slot has a vertex situated where the junction wall, the radial arc extension, and the convex shoulder extension meet.

* * * * *